United States Patent [19]

Flynn et al.

[11] Patent Number: 5,334,399
[45] Date of Patent: Aug. 2, 1994

[54] METHOD OF PREPARING LACTOSE-HYDROLYZED MILK WITH SUPPRESSED SWEETNESS

[75] Inventors: Robert G. Flynn, West Windsor Township, Mercer County; Abraham I. Bakal, Parsippany; Margaret A. Snyder, Lake Hiawatha, all of N.J.

[73] Assignee: Sterling Winthrop Inc., New York, N.Y.

[21] Appl. No.: 842,716

[22] Filed: Feb. 27, 1992

[51] Int. Cl.[5] .............................................. A23C 9/12
[52] U.S. Cl. ........................................ 426/42; 426/34; 426/330.2; 426/580
[58] Field of Search .................... 426/34, 42, 43, 330, 426/330.2, 580, 583, 587, 588

[56] References Cited

U.S. PATENT DOCUMENTS 2,749,242  6/1956  Stimpson et al. ................ 426/41
5,045,336  9/1991  Lindley et al. ................... 426/534

OTHER PUBLICATIONS

R. R. Mahoney, Developments In Dairy Chemistry, Chapter 3, Edited by P. F. Fox, Elsevier Applied Science Publishers, 1985, Jacober-Pivarnik et al., Journal of Food Science, 49, 435-438, 445 (1984).

Primary Examiner—Donald E. Czaja
Assistant Examiner—Leslie Wong
Attorney, Agent, or Firm—Richard A. Hake; Paul E. Dupont; Frederick W. Stonner

[57] ABSTRACT

A lactose-hydrolyzed fluid milk comprising fluid milk, the normal lactose content of which has been reduced by at least about 70% by lactase hydrolysis, having incorporated therein from about 0.01 to about 0.15% by weight of potassium chloride, a process for its preparation and a method of suppressing perceived sweetness of lactose-hydrolyzed milk by incorporating therein potassium chloride.

9 Claims, No Drawings

METHOD OF PREPARING LACTOSE-HYDROLYZED MILK WITH SUPPRESSED SWEETNESS

BACKGROUND OF THE INVENTION (a) Field of the Invention

This invention relates to fluid milk in which a major amount of the lactose present therein has been hydrolyzed by lactase enzymes and to milk products derived therefrom and more specifically to such fluid milk and milk products which incorporate potassium chloride to counteract increased sweetness resulting from lactose hydrolysis.

(b) Information Disclosure Statement

It is generally known that milk and milk products contain high percentages of lactose. For example, the lactose content of regular homogenized pasteurized milk (3.5% butterfat) is 4.9%, of lowfat milk (2% butterfat) is 6.0%, and of fluid skim milk is 5.1%.

It is well known to those familiar with the state-of-the-art, that there exists a significant population which cannot totally digest lactose. This population is generally referred to in the professional literature as lactose intolerant. The estimated number of individuals exhibiting lactose malabsorption in the USA is between 28 and 75 million. The incidence in certain population subgroups is significantly higher than others. For example, it is estimated that lactose intolerance in American blacks may be over 60%, whereas the incidence in American whites is less than 25%.

It is generally believed that individuals suffering from lactose intolerance have lactase deficiency. Several approaches have been undertaken by the industry to alleviate this problem. Generally, these approaches may be classified into two categories:

(1) Providing to the lactose intolerant individual an enzyme preparation which contains a stabilized form of lactase. This preparation is ingested within a prescribed time prior to or with the ingestion of the lactose containing products.

(2) Hydrolyzing the lactose using lactase enzymes prior to its ingestion. For example, lactase enzymes are added to fluid milk and sufficient time is allowed to assure the hydrolysis of the lactose into glucose and galactose.

Lactase is a trivial name for the $\beta$-galactosidases which catalyze the hydrolysis of lactose to its component saccharides, glucose and galactose. Sources of lactase, including commercial sources, are described in the literature. See, for example, R. R. Mahoney, Developments In Dairy Chemistry, Chapter 3, Edited by P. F. Fox, Elsevier Applied Science Publishers, 1985. Lactase enzymes used in processing dairy foods are derived from the yeasts *Kluyveromyces fragilis, Kluyveromyces lactis* and *Clandida pseudotropicalis*. Lactase enzymes are available both in liquid form, e.g., as solutions in water/glycerin, or in powder form. The activity of these enzymes is based on neutral lactase units (NLU) as determined by assay and falls in the range of from approximately 1000 to 5000 NLU/gram. It requires one gallon of 1000 NLU/gram activity product to convert 1000 gallons of milk to a 70% lactose hydrolysis level in twenty-four hours when the milk is stored at 40° F. Conversely, it requires 1/5 of a gallon of 5000 NLU/gram activity product to accomplish 70% lactose hydrolysis in twenty-four hours when the milk is stored at 40° F.

The Food and Drug Administration has determined that hydrolyzed lactose products must contain at least 70% less lactose than the non-hydrolyzed product. Lactose-hydrolyzed, ultra-pasteurized or pasteurized milk containing at least 70% less lactose have been available in the USA for several years.

The literature describes several methods for hydrolyzing the lactose (see R. R. Mahoney, *supra*). The most widely used process today involves the addition of lactase enzymes and incubation at 40° F. for the necessary time to achieve at least 70% lactose hydrolysis. The major disadvantage of this method is the cost of the enzyme. Another problem associated with this process is the inability to control closely the end point of the hydrolysis. This is because of the time required to inactivate the enzyme in a whole batch of milk in a commercial dairy. To overcome these problems a continuous process using immobilized enzymes was proposed. However, this process is not commercially utilized for the hydrolysis of milk at this time.

Since glucose and galactose, the products of hydrolyzed lactose, are sweeter than lactose, lactose-hydrolyzed milk, when tasted, is sweeter than regular milk. This detracts significantly from its consumer acceptance.

Jacober-Pivarnik et al., Journal of Food Science, 49, 435–438, 445 (1984), disclose an enzyme assay that can be used to accurately reflect lactase activity using a nonfat dry milk substrate. The assay was used to evaluate the effect of potassium ions, incorporated as potassium chloride, as a stabilizer and activator on four yeast lactase enzymes. In the description of the procedure used in studying the effect of potassium ion, it is disclosed that a concentration of 36 mM KCl, i.e., about 0.27% by weight, was used throughout the study since it reflected the level of potassium ions present in milk.

SUMMARY OF THE INVENTION

Since the excess sweetness of lactose-hydrolyzed milk detracts from consumer acceptance, it is evident that a need exists for a more acceptable lactose-hydrolyzed milk. It has now unexpectedly been found that the addition to lactose-hydrolyzed milk of potassium chloride within a critical range of concentrations suppresses the perceived sweetness of the milk resulting from glucose and galactose formed by hydrolysis of the lactose, thus increasing its consumer acceptance.

Thus, in one aspect, the invention provides a lactose-hydrolyzed fluid milk comprising fluid milk, the normal lactose content of which has been reduced by at least about 70% by lactase hydrolysis, having incorporated therein from about 0.01 to about 0.15% by weight of potassium chloride.

In another aspect, the invention provides a method of suppressing perceived excess sweetness of lactose-hydrolyzed fluid milk the normal lactose content of which has been reduced by at least about 70% by lactase hydrolysis which comprises incorporating in the milk from about 0.01 to about 0.15% by weight of potassium chloride.

DETAILED DESCRIPTION INCLUSIVE OF PREFERRED EMBODIMENTS

As used herein the term "normal lactose content" refers to the amount of lactose inherently present in milk as obtained from the cow; and the term "lactose-hydrolyzed milk" refers to dairy milk the normal lactose content of which has been reduced to at least about 70% by the hydrolysis of the lactose by lactase enzyme and includes whole milk, lowfat milk (e.g., 1–2% butterfat content) and nonfat milk.

Dairy milk as obtained from the cow inherently contains both potassium and chloride ions. Therefore, it will be understood that in practicing the invention, the potassium chloride incorporated in the dairy milk in accordance with this invention is from an external source, i.e., is in addition to the potassium and chloride ions inherent in the dairy milk.

The potassium chloride incorporated in the lactose-hydrolyzed milk should be of food or USP grade. The concentration to be incorporated is in the range of from about 0.01 to about 0.15 percent by weight. Preferably the percent by weight concentration is in the range of from about 0.02 to about 0.075, and more preferably from .about 0.03 to about 0.06, especially from about 0.04 to about 0.05 and optimally about 0.04.

The potassium chloride can be added to the milk at any stage in its processing for consumption. Thus it can be added prior to or during the incubation of the milk with lactase or subsequent thereto. In the latter case, it can be added at the dairy where the milk is processed or after purchase by the consumer. When added by the consumer it can be in any convenient form, e.g., in liquid or tablet form. For example, there currently is commercially available to the consumer lactase preparations in liquid form for addition to milk which has not been subjected to lactase treatment in order to reduce its lactose content. Such preparation could additionally have incorporated therein potassium chloride in an amount which will provide the concentration required in the milk in accordance with the invention.

The potassium chloride, when added to the milk during processing, can be incorporated by any standard procedure. For example, it can conveniently be incorporated by sprinkling the appropriate amount into the milk and gently agitating the milk until the potassium chloride is dissolved.

The invention is illustrated by the following examples without, however, being limited thereto.

A test was conducted to evaluate the relative sweetness of two commercially available skim milks, one regular, i.e., not lactose-hydrolyzed, and the other lactose-hydrolyzed. The degree of lactose hydrolysis was determined using a cryoscope and confirmed by HPLC and found to be 80%. The two skim milks were evaluated using an expert panel consisting of individuals selected for their taste acuity and trained in flavor profiling techniques. In this test the expert panel consisted of seven individuals and the test was carried out two times for a total of fourteen observations.

All samples submitted to the expert panel were coded. The skim milks were evaluated for the following attributes:

| Sweet | on a scale of 0 (none) to 8 (very sweet) |
|---|---|
| Bitter | on a scale of 0 (none) to 8 (very bitter) |
| Salt | on a scale of 0 (none) to 8 (very salty) |
| Sour | on a scale of 0 (none) to 8 (very sour) |
| Overall quality | on a scale of 0 (dislike extremely) to 8 (like extremely) |

The results of the expert panel's evaluation, expressed as a mean of the scores, are summarized below where A represents the regular skim milk and B represents the lactose-hydrolyzed skim milk.

| Attribute | A | B |
|---|---|---|
| Sweet | 1.0 | 3.5* |
| Sour | 0.5 | 1.0 |
| Salty | 0 | 0 |
| Bitter | 0 | 0.1 |
| Overall quality | 6.4 | 3.0* |

*Significantly different from control at the 99% confidence level

These results clearly show that the lactose-hydrolyzed skim milk (B) is sweeter and less acceptable than the regular skim milk (A).

EXAMPLE 1

Potassium chloride was added to samples of the same lactose-hydrolyzed skim milk used in the above described test. The levels of potassium chloride incorporated in the milk were 0.05, 0.075, 0.1, 0.15 and 0.5 wt-%. These samples and samples of the lactose-hydrolyzed skim milk to which no potassium chloride had been added (control samples) were evaluated for their attributes on a scale of 0 to 8 by the same expert panel of seven individuals used in the test described above. All samples submitted to the expert panel were coded. The results, expressed as a mean of the scores, are summarized below.

| | Lactose-Hydrolyzed Skim Milk | | | | | |
|---|---|---|---|---|---|---|
| | | KCl level: | | | | |
| | Control | 0.05 | 0.075 | 0.10 | 0.15 | 0.5 |
| Sweet | 3.5 | 2.5* | 2.0* | 2.0* | 2.2* | 2.0 |
| Sour | 1.0 | 1.2 | 1.2 | 0.8 | 1.3 | 1.2 |
| Salty | 0 | 0.3 | 0.3 | 0.3 | 0.5 | 0.3 |
| Bitter | 0.1 | 0 | 0.5 | 0.1 | 0.5 | 0.8 |
| Overall Quality | 3.0 | 4.0* | 4.3* | 4.5* | 3.7** | 3.2 |

*Significantly different from control at the 99% confidence level
**Significantly different from control at the 99% confidence level These results clearly show that the incorporation of potassium chloride in lactose-hydrolyzed skim milk of between 0.05 and 0.5 weight-percent reduces the perceived sweetness of the milk. Furthermore, improvement in the overall quality of the milk was noted in the range of 0.05 to 0.15 weight-percent of potassium chloride.

EXAMPLE 2

Lowfat milk (1% butterfat) was processed at a UHT (ultrahigh temperature) plant facility as follows:

To pasteurized lowfat milk, lactase enzyme having an activity of 955 NLU/g was added to provide a concentration of 0.02% enzyme. The lowfat milk containing the enzyme then was incubated in a refrigerator at 40° F. The temperature of the milk was measured at 42° F.±2° F. The degree of hydrolysis was determined using a cryoscope. To 70% lactose-hydrolyzed milk so prepared was added sufficient potassium chloride to provide 0.075 weight-percent concentration. The milk then was subjected to UHT treatment and aseptically packaged in gallon containers. Two controls also were prepared, one a non-hydrolyzed lowfat milk, i.e., lowfat milk (1% butterfat) which was not lactose-hydrolyzed, and the other 70% lactose-hydrolyzed lowfat milk (1% butterfat), both UHT treated and neither containing potassium chloride. The three milk products were evaluated by the same taste panel of seven individuals with the following results (expressed as a mean of the scores).

| Attribute | Control (no lactose hydrolysis) (no KCl) | Control (70% lactose hydrolysis) (no KCl) | 70% lactose-hydrolyzed lowfat milk + 0.075 wt % KCl |
|---|---|---|---|
| Sweet | 1.5 | 3.0 | 2.2* |
| Sour | 0.5 | 0 | 0 |
| Salty | 0 | 0 | 0 |
| Bitter | 0 | 0 | 0 |
| Overall Quality | 6.2 | 4.0 | 4.8* |

*Significantly different from lactose-hydrolyzed control at 95% confidence level These results clearly show that the addition of potassium chloride to lactose-hydrolyzed lowfat milk reduces the perceived sweetness and increases the overall quality thereof.

EXAMPLE 3

Lactose-hydrolyzed nonfat and lowfat (1% butterfat) milk containing 0.04 wt-% (1.5 g/gal) of potassium chloride each were prepared by a procedure similar to that described in Example 2 and their attributes where compared with the corresponding lactose-hydrolyzed nonfat and lowfat milk to which in each case no potassium chloride had been added. These milk samples were evaluated for their attributes by an expert panel of ten individuals on a scale of 0 to 8 as described above. The results, expressed as a mean of 10 scores, are summarized below.

| Attribute | Lactose-Hydrolyzed Milk | | | |
|---|---|---|---|---|
| | Nonfat | | Lowfat | |
| | With KCl | No KCl | With KCl | No KCl |
| Sweet | 1.4 | 2.4* | 0.4 | 0.9** |
| Sour | 0.3 | 0.3 | 0 | 0 |
| Salty | 0.1 | 0 | 0 | 0 |
| Bitter | 0.2 | 0.2 | 0.2 | 0 |
| Off-flavor$^a$ | 0 | 0.1 | 0 | 0 |

$^a$ 0 = none, 8 = very strong
*Denotes significance at the 99% confidence level using paired t-test
**Denotes significance at the 95% confidence level using paired t-test These results clearly show that the sweetness of the lactose-hydrolyzed milk was reduced by the addition of 0.04 wt-% of potassium chloride.

EXAMPLE 4

Lactose-hydrolyzed lowfat (1% and 2% butterfat) and nonfat milk each containing concentrations of KCl of 0, 0.02, 0.03, 0.04, 0.05 and 0.075 were prepared by procedures similar to that described in Example 2 and evaluated by an expert panel of 10 individuals for their attributes on a scale of 0 to 8 in order to determine the optimum concentration of potassium chloride. All samples were coded. The results, expressed as a mean of 10 scores, are summarized below.

| EFFECT OF THE ADDITION OF POTASSIUM CHLORIDE TO LACTOSE HYDROLYZED MILK | | |
|---|---|---|
| KCl Concentration wt % | Sweetness Intensity Rating | Level of Aftertaste |
| Lowfat Milk (2%) | | |
| 0.0 | 2.0 | 0.2 |
| 0.02 | 2.2 | 0.2 |
| 0.03 | 1.5 | 0.2 |
| 0.04 | 0.9 | 0.2 |
| 0.05 | 1.0 | 0.4 |
| 0.075 | 1.2 | 0.7 |
| Lowfat Milk (1%) | | |
| 0.0 | 2.4 | 0.0 |
| 0.02 | 1.7 | 0.1 |
| 0.03 | 1.5 | 0.2 |
| 0.04 | 0.7 | 0.3 |
| 0.05 | 0.8 | 0.3 |
| 0.075 | 1.2 | 0.6 |
| Nonfat Milk | | |
| 0.0 | 2.1 | 0.2 |
| 0.02 | 1.9 | 0.3 |
| 0.03 | 1.6 | 0.3 |
| 0.04 | 0.7 | 0.3 |
| 0.05 | 0.9 | 0.3 |
| 0.075 | 1.3 | 1.0 |

These results clearly indicate that the addition of potassium chloride reduces the perceived sweetness of the lactose-hydrolyzed milk, the optimum concentration of KCl being about 0.04 wt-%.

EXAMPLE 5

Two ultra-pasteurized lactose-hydrolyzed lowfat (1% butterfat) milks, one having incorporated therein 0.04 wt-% potassium chloride and prepared by a procedure similar to that described in Example 2, and the other obtained from a commercial source and having no potassium chloride incorporated therein were compared to a control. The control was a pasteurized lowfat (1% butterfat) milk, obtained from a commercial source, which neither had been lactose-hydrolyzed nor had potassium chloride incorporated therein. The purpose of the comparative test was to determine which of the two lactose-hydrolyzed milks was closest, or most similar, in taste to the control. An expert panel of ten individuals participated in the test. All samples of milk were coded. The panelists were instructed to taste the control sample first and then the test sample in the order presented on a tray, from left to right, and that after the first round of testing in order, they could switch back and forth between the test samples and retaste the control sample as often as needed to refresh their taste memory. A similar comparative test was conducted with two corresponding samples of nonfat milk and a corresponding nonfat milk control.

In the above described comparative tests, 9 of the 10 panelists selected the lactose-hydrolyzed lowfat milk with incorporated potassium chloride as being closest in taste to the control; and all 10 of the panelists selected the lactose-hydrolyzed nonfat milk with incorporated potassium chloride as being closest in taste to the control.

EXAMPLE 6

Nonfat and lowfat (1% butterfat) milk were hydrolyzed at a dairy plant. Once the degree of hydrolysis exceeded 80%, 500 gallons of each lactose-hydrolyzed milk was transferred to a tank. The remainder (control) was passed through the UHT process and packaged. To the 500 gallon sample, 0.04 wt-% of potassium chloride was added and thoroughly mixed to assure complete dissolution. This potassium chloride containing lactose-hydrolyzed milk was passed through the same UHT process as the control and packaged. Samples of the control and the treated lactose-hydrolyzed milks were analyzed for the degree of lactose hydrolysis using HPLC. The milks were subjected to an expert taste panel six days and six weeks after production. All samples were coded. The results, expressed as a mean of the scores, for the nonfat and lowfat milk are summarized below.

| | Lactose-Hydrolyzed Nonfat Milk | | |
|---|---|---|---|
| | | With 0.04% KCl Added | |
| Attributes | Control | After 6 Days* | After 6 Weeks* |
| Sweet | 2.4 | 1.4** | 1.0** |
| Sour | 0.3 | 0.3 | 0.3 |
| Salty | 0.0 | 0.1 | 0.0 |
| Bitter | 0.2 | 0.2 | 0.0 |
| Off-flavor | 0.1 | 0.0 | 0.0 |
| % Lactose hydrolysis | 82.1 | 81.8 | 81.8 |

*Stored at 40° F.
**Significantly different from control at the 95% confidence level using t-test statistic

| | Lactose-Hydrolyzed Lowfat Milk | | |
|---|---|---|---|
| | | With 0.04% KCl Added | |
| Attributes | Control | After 6 Days* | After 6 Weeks* |
| Sweet | 1.1 | 0.4** | 0.4** |
| Sour | 0.0 | 0.0 | 0.3 |
| Salty | 0.0 | 0.0 | 0.2 |
| Bitter | 0.2 | 0.2 | 0.0 |
| Off-flavor | 0.0 | 0.0 | 0.2 |
| % Lactose hydrolysis | 84.4 | 83.3 | 83.3 |

*Stored at 40° F.
**Significantly different from control at the 95% confidence level using t-test statistic The above results clearly indicate that the addition of 0.04% KCl decreased the perceived sweetness level significantly without increase in the perceived off-flavor level. The results further show that no changes in the product flavor were noticed after up to 6 weeks of storage.

EXAMPLE 7

Two ultra-pasteurized lactose-hydrolyzed lowfat (1% butterfat) milks, one having 0.04 wt-% potassium chloride incorporated therein and prepared by a procedure similar to that described in Example 2, and the other obtained from a commercial source and having no potassium chloride incorporated therein, were compared with a control. The control was a pasteurized lowfat (1% butterfat) milk obtained from a commercial source which neither had been lactose-hydrolyzed nor had potassium chloride incorporated therein. The purpose of the test was the same as for that described in Example 5. However, in this case the comparison was made by twenty consumers recruited from the same geographic area, all of whom were regular users of lowfat and nonfat milks. The consumers were each given a coded sample of the two lactose-hydrolyzed milks and the control and instructed to taste the control and the two lactose-hydrolyzed samples and to select which of the latter two samples was closest in taste to the control. A similar comparative test was conducted with the same twenty consumers with two corresponding samples of nonfat milk and a corresponding nonfat control.

In the above described comparative tests, seventy percent of the consumers chose the lactose-hydrolyzed lowfat milk with incorporated potassium chloride as being closest in taste to the control; and eighty-five percent of the consumers chose the lactose-hydrolyzed nonfat milk with incorporated potassium chloride as being closest in taste to the control.

The invention claimed is:

1. A process for modifying a lactose-hydrolyzed fluid milk, the normal lactose content of which has been reduced by at least about 70% by lactase hydrolysis, in order to suppress perceived sweetness resulting from glucose and galactose produced by the lactose hydrolysis, which comprises incorporating into the lactose-hydrolyzed fluid milk from about 0.02 to about 0.075% by weight of potassium chloride.

2. A process according to claim 1 wherein the potassium chloride is incorporated prior to packaging for consumer use.

3. A process according to claim 1 wherein the potassium chloride is incorporated after packaging for consumer use.

4. A method of suppressing perceived excess sweetness of lactose-hydrolyzed fluid milk the normal lactose content of which has been reduced by at least about 70% by lactase hydrolysis which comprises incorporating in the lactose hydrolyzed milk from about 0.2 to about 0.075% by weight of potassium chloride.

5. A method according to claim 4 wherein from about 0.03 to about 0.06% by weight of potassium chloride is incorporated.

6. A method according to claim 5 wherein from about 0.04 to about 0.05% by weight of potassium chloride is incorporated.

7. A method according to claim 6 wherein about 0.04% by weight of potassium chloride is incorporated.

8. A method according to claim 4 wherein the potassium chloride is incorporated prior to packaging for consumer use.

9. A method according to claim 4 wherein the potassium chloride is incorporated after packaging for consumer use.

* * * * *